United States Patent [19]

Kinley et al.

[11] 4,299,033
[45] Nov. 10, 1981

[54] CALIPERING TOOL

[75] Inventors: John C. Kinley; Harry E. Dieckman, both of Houston; Clifford E. Anderson, Huntsville, all of Tex.

[73] Assignee: J. C. Kinley Company, Houston, Tex.

[21] Appl. No.: 108,388

[22] Filed: Dec. 31, 1979

[51] Int. Cl.³ .............................................. G01B 5/08
[52] U.S. Cl. ................................ 33/178 F; 33/174 PA
[58] Field of Search ........... 33/178 F, 174 P, 174 PA, 33/302

[56] References Cited

U.S. PATENT DOCUMENTS

| | | | |
|---|---|---|---|
| 2,925,660 | 2/1960 | Raulins | 33/178 F |
| 2,933,819 | 4/1960 | Kinley | 33/178 F |
| 3,010,212 | 11/1961 | Kinley | 33/178 F |
| 3,061,938 | 11/1962 | Anderson et al. | 33/178 F |

Primary Examiner—Willis Little
Attorney, Agent, or Firm—Pravel, Gambrell, Hewitt, Kirk, Kimball & Dodge

[57] ABSTRACT

A calipering tool for use in a pipe and having a body and feeler means mounted with the body for engaging the surfaces of the pipe being calipered and with feelers moving in response to variations in the surface of the pipe, improvements residing in pairs of stylus members, including active and base-line styli, each active stylus adapted to engage a chart and move relative thereto in response to movements of a feeler and with each base-line stylus adapted to engage the chart adjacent the active stylus for providing an individual base-line for the respective active stylus for providing accurate dimensional recording and continuing thermal calibration of the calipering tool in response to temperature variations encountered within the pipe and a new removable stylus assembly capable of being removed from the calipering tool as a unit for repair and/or replacement as is necessary without requiring replacement of the entire calipering tool.

27 Claims, 18 Drawing Figures

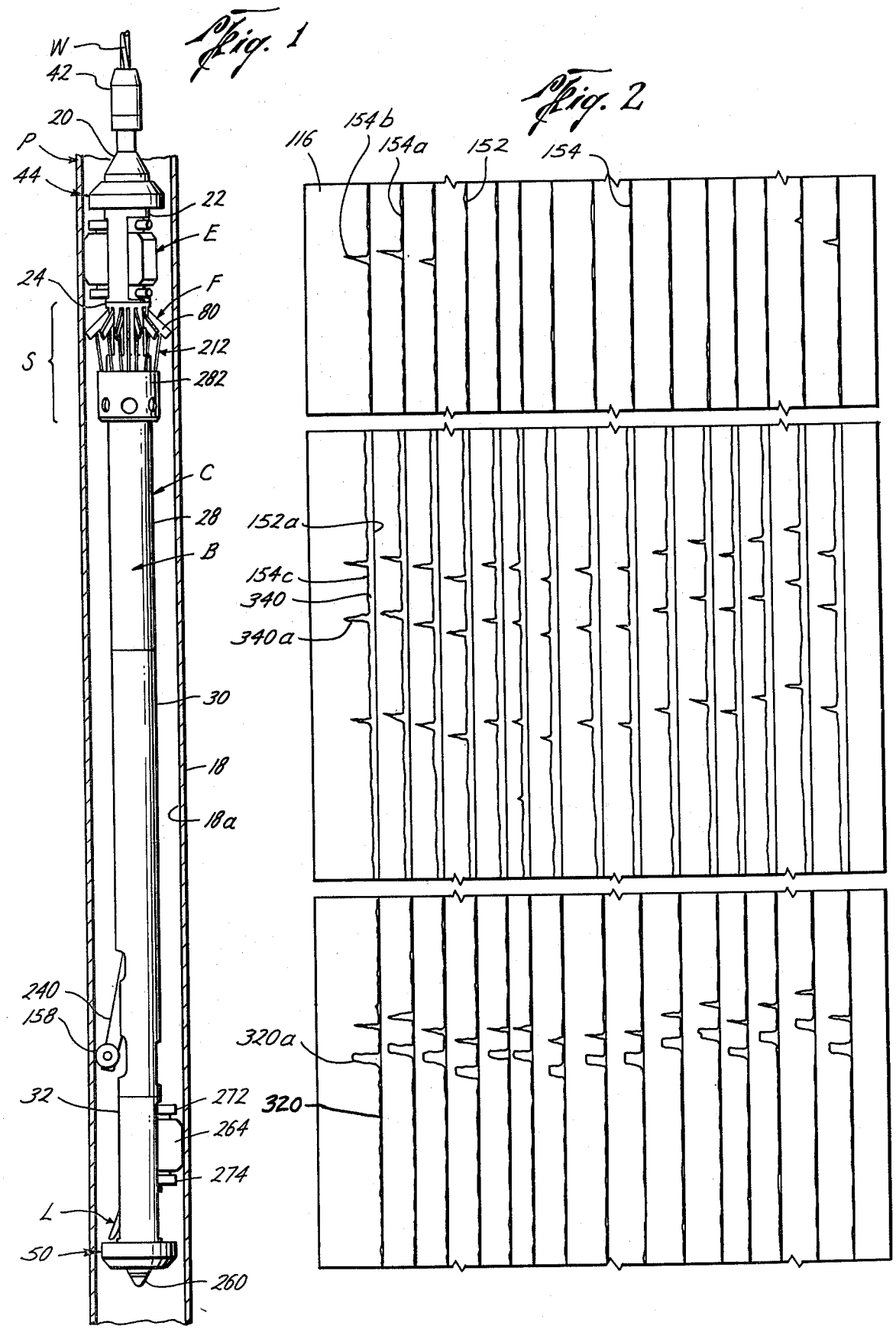

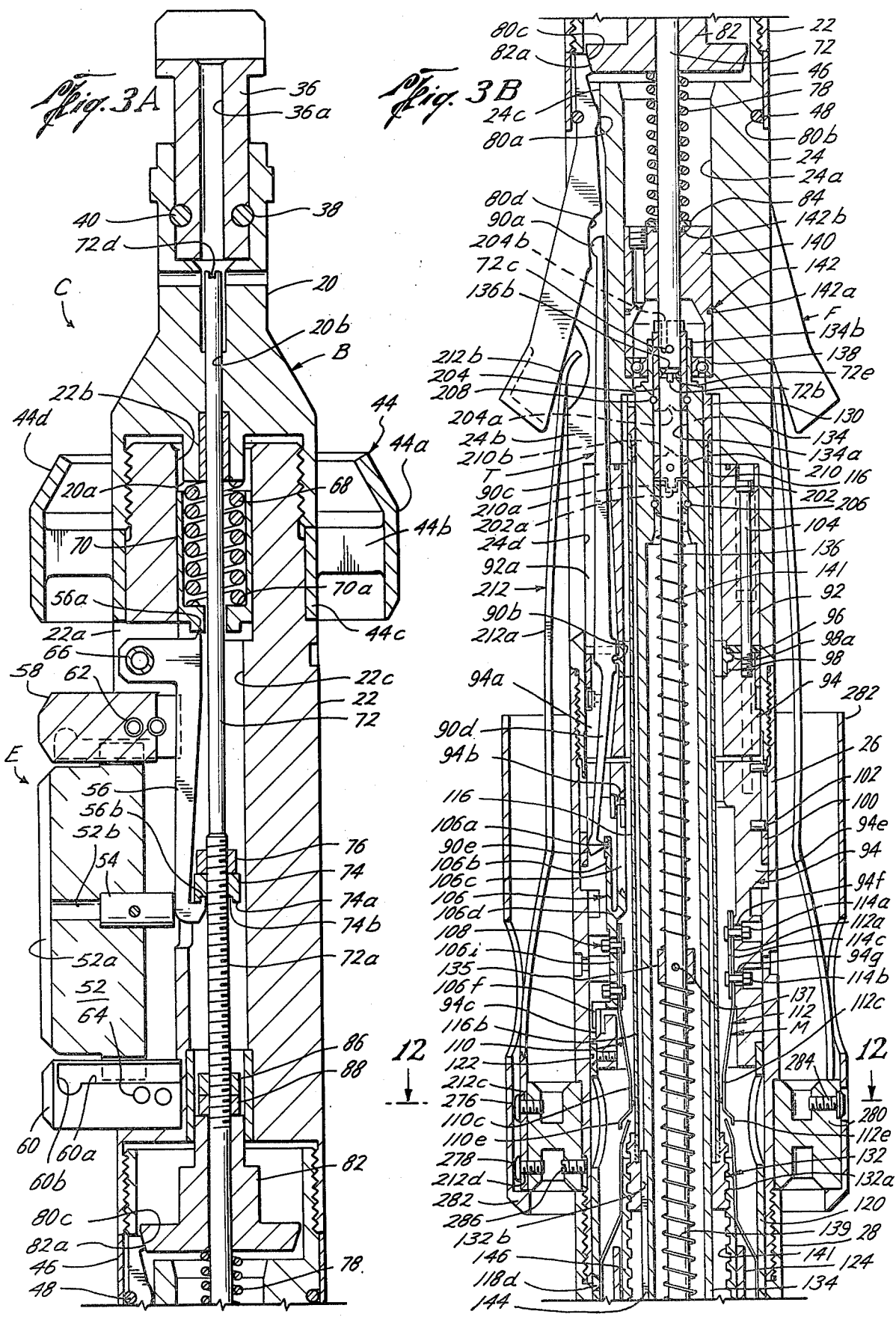

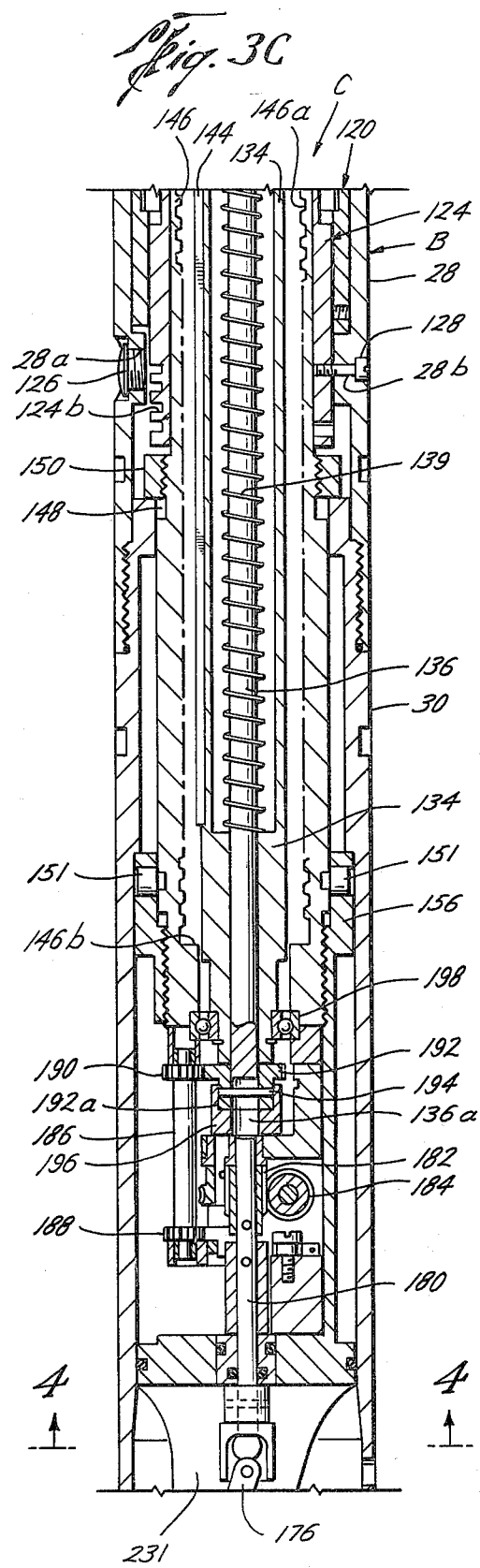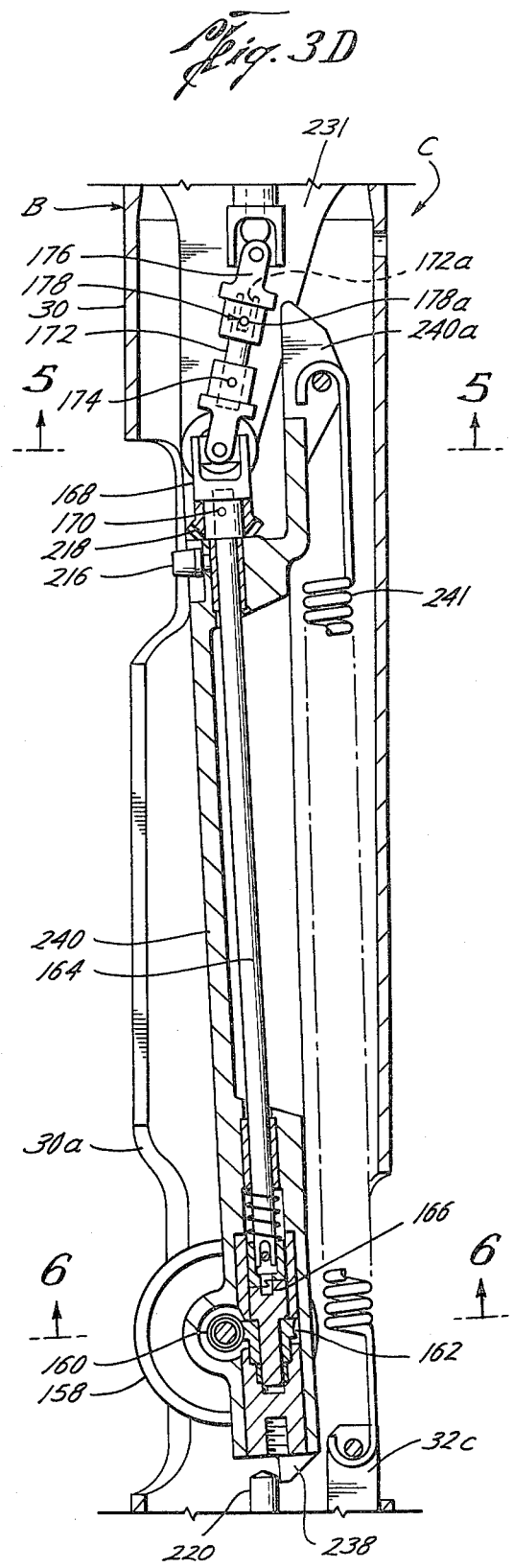

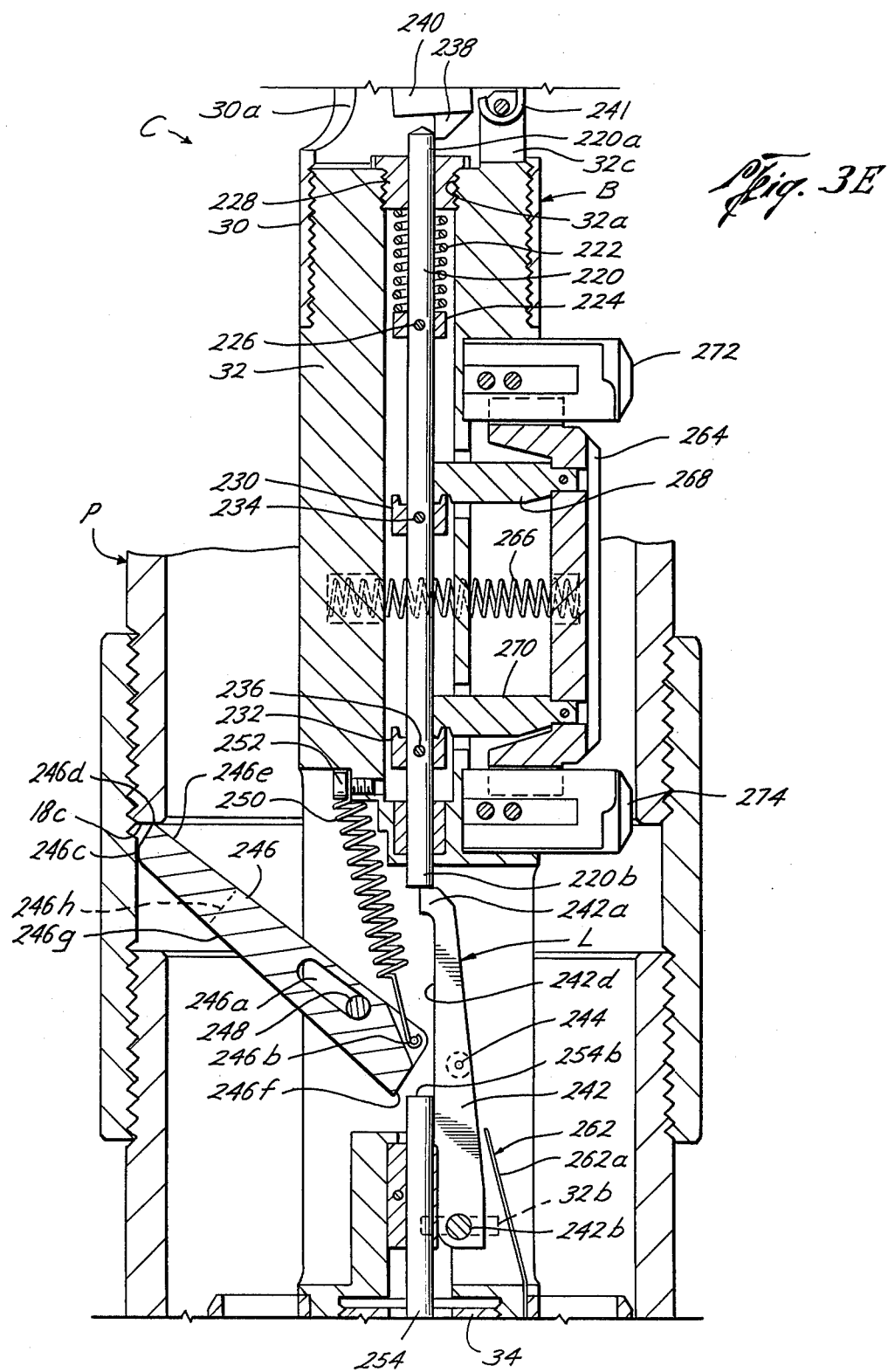

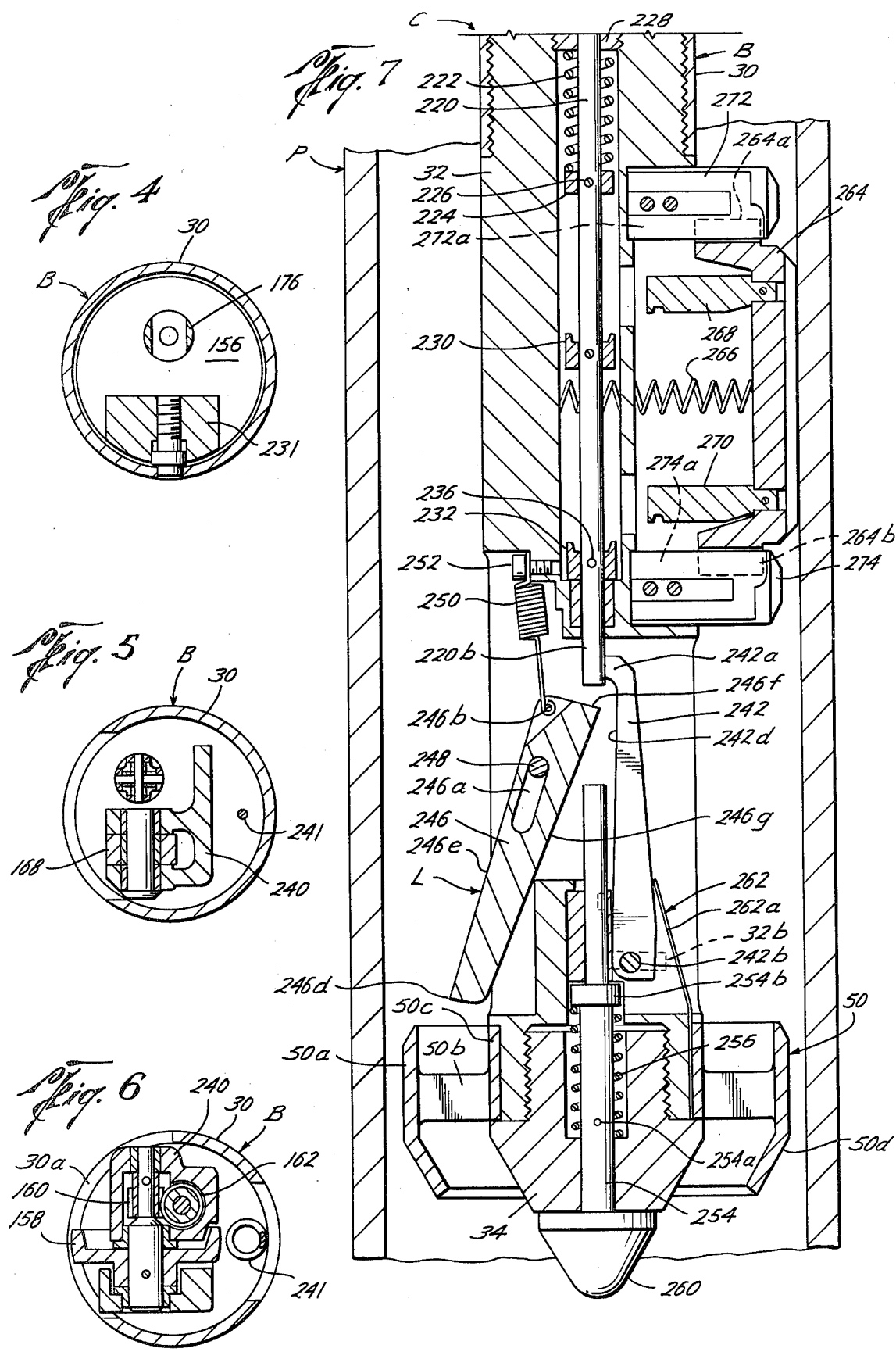

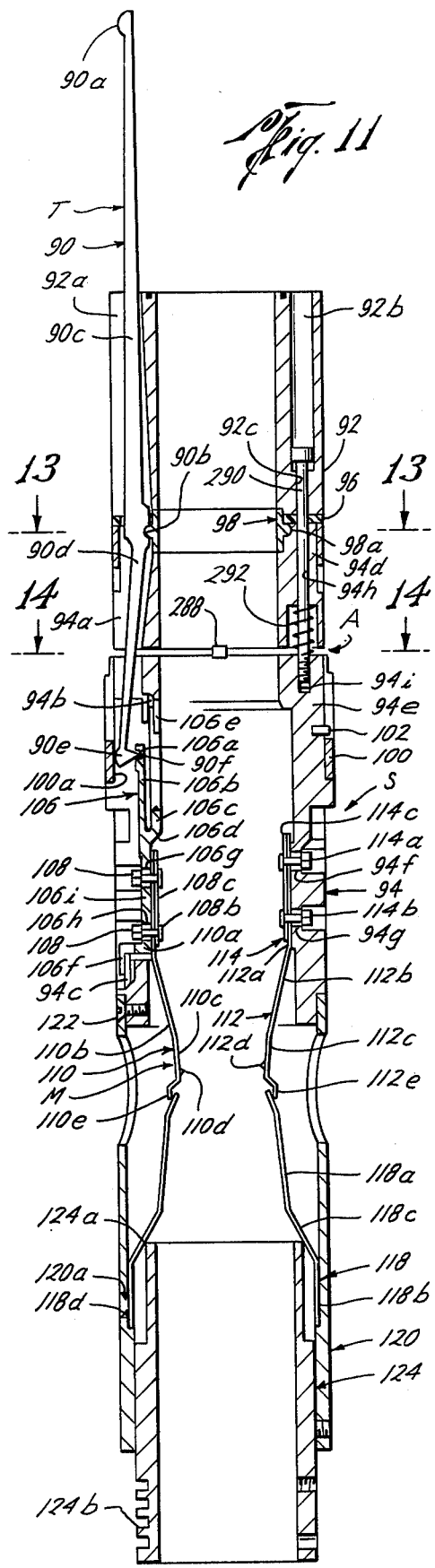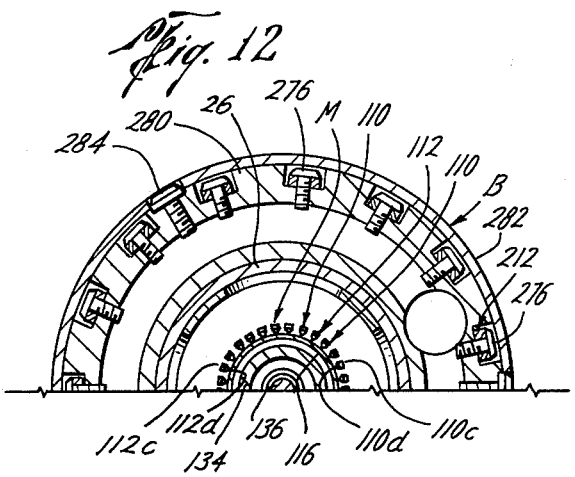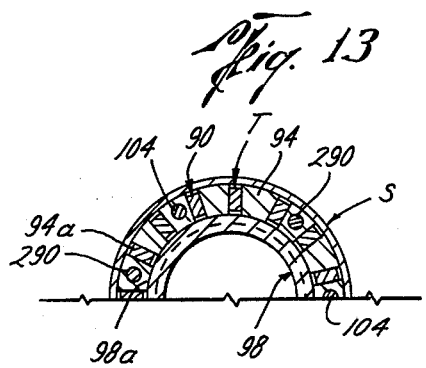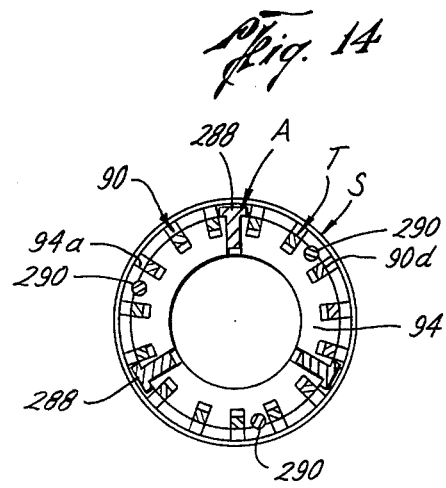

CALIPERING TOOL

TECHNICAL FIELD OF THE INVENTION

The field of this invention relates to calipering tools, and particularly to pipe calipering tools for indicating surface variations in a pipe such as those used in a well.

PRIOR ART

Well calipers for locating corrosion pits and other internal defects in well tubing in pipes are well known as shown in U.S. Pat. No. 3,061,938. However, so far as known, no calipering tool is available that currently can accurately counteract the ill-effects of temperature variations across such a calipering tool as it is used within the pipe to be calipered. For instance, at various elevations within a well, many varying temperatures may be encountered, all causing expansion and contraction of various components of the calipering tool, all at differing rates of thermal expansion and/or contraction based upon differing materials that are used, different size components of a same material, and the like. Therefore, in the past, uncorrected thermal errors have been a part of all calipering tool readings.

Furthermore, previous calipers have relied upon beginning and ending gauge marks for referencing the theoretical inside diameter of the pipe to be calipered. Actual calipered variations must necessarily be referred back to these gauge marks for determining the depth of recorded pits. Accuracy has been difficult to obtain and is quite time consuming even without the added problems caused by thermal drift.

Furthermore, prior art devices require removal and replacement of the entire calipering tool in order to effectuate repair of the active components of such a calipering tool upon breakdown thereof. In such a case, the calipering tool would necessitate removal from the wireline and replacement with a complete second calipering tool in order to remain in operation, a procedure that is costly and inefficient.

SUMMARY OF THE INVENTION

It is an object of the present invention to provide a calipering tool of increased accuracy and which is capable of overcoming the ill effects of temperature variations encountered in a pipe being calipered as well as for providing component service assemblies for ease in maintenance, adjustments and operation thereof.

The calipering tool of the present invention is used in a pipe and having a body and feeler means mounted with the body for engaging a surface of the pipe being calipered. The feeler means move in response to variations in the surface of the pipe with the improvement of the present invention residing in a plurality of pairs of stylus members including active and base-line styli. Each active stylus is adapted to engage the chart and move relative thereto in response to movements of the feeler means for recording movement of the feeler means on the chart. Each of the base-line styli is adapted to engage the chart adjacent each respective active styli for providing individual base lines on the chart corresponding to each of the respective active styli for providing accurate calibration of the calipering tool in spite of temperature variations encountered within the pipe.

A further improvement of the present invention is that lines traced onto the caliper chart by both the active and base-line styli permit a vastly improved ability to accurately measure the dimensional variations encountered by the active styli as the feeler means engages pits and other irregularities in the pipe being calipered.

An additional improvement of the calipering tool of the present invention is the ability to easily adjust the relative position of the active stylus to the base-line stylus so that the traces of the base-line styli can compensate for the inside diameter variations inherent in the various weights of pipe, thus making actual active stylus movement and its tracings thereof easier to evaluate.

Another improvement is the ability to manually position the chart for maximum protection of the scribing surfaces under all conditions.

A further improvement of the present invention includes a removable stylus assembly capable of being easily removed from the calipering tool and replaced. Furthermore, the calipering tool of the present invention further includes an improved latch mechanism and drive mechanism as discussed more fully hereinbelow.

It should be understood that this description of the invention is not intended to be limiting but is only exemplary of the many patentable features of this invention, which are set forth in the claims.

DESCRIPTION OF THE DRAWINGS

FIG. 1 is an elevational view of the calipering tool of the present invention shown in position within a well tubing or pipe to indicate the customary use of the tool of this invention;

FIG. 2 provides a representative sample of the trace lines of the active stylus and base lines of the base-line stylus of the stylus members as appears in a paper copy of the chart of the calipering tool of the present invention;

FIGS. 3A, 3B, 3C, 3D, and 3E are vertical, sectional views, partly in elevation, illustrating in detail the calipering tool of the present invention from the upper end thereof to the lower end thereof, respectively;

FIG. 4 is a sectional plan view taken along the lines 4—4 of FIG. 3C;

FIG. 5 is a sectional plan view taken along the lines 5—5 of FIG. 3D;

FIG. 6 is a sectional plan view taken along the lines 6—6 of FIG. 3D;

FIG. 7 is a vertical, sectional view, partly in elevation, similar to FIG. 3E, but showing the latch mechanism of the present invention in a released position;

FIG. 11 is a vertical, sectional view, partly in elevation, illustrating the removable stylus assembly of the calipering tool of the present invention;

FIG. 12 is a sectional, plan view of the calipering tool of the present invention taken along the lines 12—12 of FIG. 3B;

FIG. 13 is a sectional, plan view, of the stylus assembly of the present invention taken along the lines 13—13 of FIG. 11; and, FIG. 14 is a sectional, plan view of the adjusting means of the calipering tool of the present invention, taken along the lines 14—14 of FIG. 11.

DESCRIPTION OF THE PREFERRED EMBODIMENT

Figure 9:
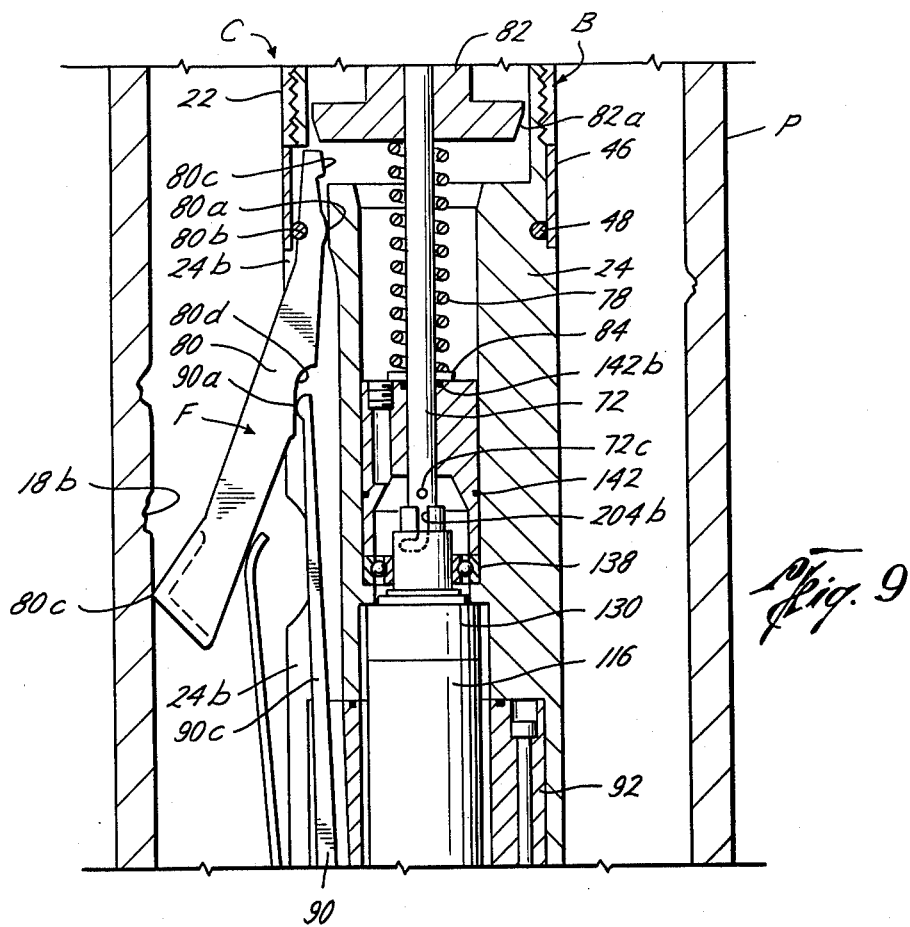
FIG. 9 is a vertical, sectional view, partly in elevation, similar to FIG. 3B, but illustrating the clutch means and feeler means of the calipering tool of the present invention in a released position.

In the drawings, the letter C designates generally the calipering tool of the present invention which is adapted to be lowered into well tubing or other pipe P on a wireline W or any other support extending from the surface of the well. Briefly, the calipering tool C includes a body B which extends for substantially the full length of the calipering tool C. As will be explained more in detail, the calipering tool C includes a plurality of feeler means F which extend from the body B and engage the inner surface of the tubing or pipe P during use of a calipering tool C. Engagement and consequent movement of the feeler means F is transmitted by transmitting means T to stylus members M for movement and recordation of such movement thereof. As will be explained, the calipering tool C is lowered into the pipe P in an inactive position with the feeler means F out of engagement with the inside of the pipe P until a latch mechanism L is actuated to effect a release of the feeler means F. Unless otherwise noted, it is preferred that the calipering tool of the present invention be made of suitable high strength, non-corrosive materials capable of taking stresses, strains, corrosive fluids, and temperatures encountered in use of such a calipering tool C during calipering operations.

Considering the invention in detail, the calipering tool C is adapted to be lowered into a pipe P such as pipe 18 having interior surface 18a, for engagement therewith for recording internal suface variations thereof. The calipering tool C includes a body B which is formed in a plurality of sections which are threaded or otherwise suitably connected together to form the complete body in the preferred form of this invention. The body B includes body members 20, 22, 24, 26, 28, 30, 32, 34. Body member 20 (FIG. 3A) is connected to the wireline W by a wireline receiver 36 having suitable shear pins 38, 40. The wireline receiver 36 is adapted to be engaged by a suitable wireline coupling 42 (FIG. 1) which in turn has the wireline W mounted therewith. The wireline W is used for raising and lowering of the calipering tool C of the present invention.

Body member 20 threadedly engages body member 22 such that end ring designated generally as 44 is disposed therebetween, as discussed more fully hereinbelow. Body member 22 is threadedly affixed with body member 24 having a suitable annular member 46 therebetween. The annular member 46 secures annular pivot ring 48, which is preferably of a circular cross-section, in position as discussed more fully hereinbelow. Body member 24 is threadedly affixed with body member 26 which in turn is threadedly affixed with body member 28 (FIG. 3B). Body member 28 is threadedly affixed to body member 30 which threadedly engages body member 32. Body member 32 is threadedly affixed with body member 34 having end ring designated generally as 50 disposed therebetween.

End rings 44, 50 are designed to protect the component parts of the calipering tool C as it is raised and lowered within the pipe P. Preferably, the end rings 44, 50 are sized slightly smaller in diameter than the interior surface 18a of the pipe 18, but of greater diameter than the feeler means F when in the retracted position shown in FIG. 3B. This allows the calipering tool C to be lowered within the pipe P without damage to the feeler means F or other component parts thereof. End ring 44 preferably includes a collar 44a connected to a web 44b which is formed with sleeve 44c. Preferably, sleeve 44c is adapted to be disposed between body members 20, 22 (FIG. 3A). Similarly, end ring 50 includes collar 50a, web 50b, and sleeve 50c, with the sleeve 50c adapted to be disposed between body members 32, 34. Preferably, the end rings 44, 50 are of similar construction and have tapered surfaces 44d, 50d, respectively, formed in collars 44a, 50a to promote guiding of the calipering tool C of the present invention out from and into the pipe P, respectively. As the inside diameter of interior surface 18a of the pipe 18 varies to different size pipes, the end rings 44, 50 may be appropriately sized to accommodate such differences in such inside diameters of such pipes 18.

Figure 10:
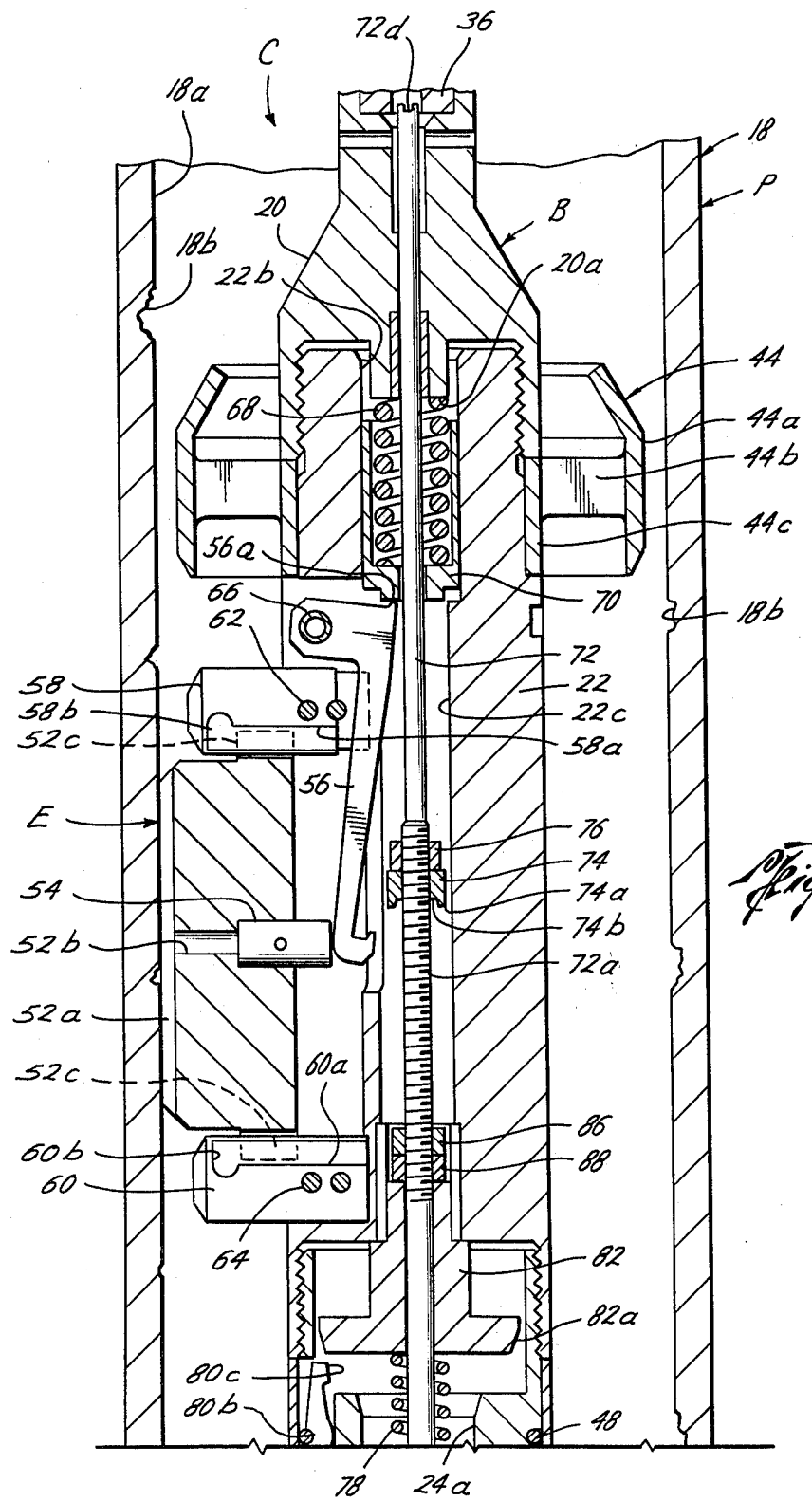
FIG. 10 is a vertical, sectional view, partly in elevation, similar to FIG. 3A, but illustrating the centering means of the present invention in a released position.

The calipering tool C of the present invention includes a centering mechanism designated generally as E, preferably positioned near the upper end of the body B. The centering mechanism E includes a plurality of pipe engaging members or shoes 52. The number of pipe engaging members or shoes 52 may be varied, but is it preferred that there are three such shoes 52 which are symmetrically arranged so as to engage the inside surface 18a of the pipe 18 at equidistance areas. The details of the centering mechanism E are shown in FIGS. 3A and 10. The body member 22 of the body B is formed with a longitudinal recess 22a for each of the pipe engaging members or shoes 52. Each of the shoes 52 is so mounted in the longitudinal recesses 22a such that they can move laterally inwardly and outwardly with respect to the body B. Preferably, the shoes 52 have appropriately shaped surface inserts 52a which permit broad face contact with the interior surface 18a of the pipe 18. Various materials may be used in constructing the pipe engaging members 52, but to reduce damage to the pipe P in which the calipering tool C of the present invention is used, the inserts 52a are normally formed of a plastic material which is relatively soft as compared to the metal or other material used in the well tubing or pipe P.

At substantially the mid-point, both laterally and vertically, of each pipe engaging member or shoe 52, a contact pad 54 is provided for engagement by a pivot arm 56, for a purpose to be hereinafter explained. The inward movement of each of the shoes 52 with respect to the body B is limited by the engagement of the shoes 52 with the pivoted arms 56. Each shoe 52 has an appropriate opening 52b to assist in removing pads 54 when desired. Centralizer posts 58, 60 are mounted with the body member 22 by suitable fasteners 62, 64 (FIGS. 3A, 10), respectively. The centralizer posts 58, 60 are formed having suitable radial slots 58a, 60a, for receiving guide fingers 52c of shoe 52 for allowing guided radial movement inwardly and outwardly of the shoes 52 with respect to the body B of the calipering tool C of the present invention. The outward radial limit of travel of the shoe 52 is limited by end portion 58b, 60 b formed with centralizer posts 58, 60, respectively.

In the preferred form of the invention, a separate pivot arm 56 is provided for each shoe 52, with the pivot arm 56 being affixed with the body member 20 by means of pivot pin 66 so as to permit each pivot arm 56 to pivot relative to the body B. A coil spring or other suitable resilient member 68 is positioned within an opening 22b formed within body member 22. The coil spring 68 confined between a laterally extending shoulder 20a of body member 20 and a lateral extending shoulder 70a of a sleeve 70 that is adapted to be disposed within opening 22b. When pivot arms 56 are free to move or pivot, the spring 68 acts in a downward direction to urge the sleeve 70 downwardly for engaging the flange 56a of the pivot arm 56 for moving the arms 56 laterally outwardly. Such outward movement of the pivot arm 56 contacts contact pad 54 with a resultant movement outwardly of the shoe 52.

When the pivot arms 56 are in a retracted position (FIG. 3A), the coil spring 68 is confined under compression and it therefore accomplishes the pivotal movement of the arms 56 when the arms 56 are released and the spring 68 expands as illustrated in FIG. 10 of the drawings. Since the arms 56 engage the shoes 52 at substantially the midpoint thereof on pads 54, each shoe when in contact with the pipe P is free to swing or pivot both longitudinally and laterally about the pad 54 until contact between the shoe 52 and interior surface 18a of pipe P is established. In such manner, the load on each shoe 52 is distributed and each shoe has its inserts 52a in contact and generally parallel with the interior surface 18a of the pipe 18. Thus, even though the interior surface 18a of the pipe 18 may not be truly vertical or straight, at a particular elevation or section, the shoes 52 can still swing to engage the interior surface 18a of the pipe P at several points, typically at three points. It should also be noted that if the body B is not centered in the pipe P when the shoes 52 are in engagement with the pipe P, then one or two of the shoes 52 will be receiving all of the spring pressure from the spring 68 which causes a rapid shifting of the body B in a direction away from the shoes 52 which are receiving the spring pressure. Such shifting moves the body B until the spring pressure from the spring 68 is uniformly distributed to each pivot arm 56 and therefore to each shoe 52 which accomplishes a centering of the body B in the pipe P.

The means for holding the pivot arms 56 in the retracted position shown in FIG. 3A and for subsequently releasing same includes a release rod 72 which extends through central openings 20b, 22c, 24a of body members 20, 22, 24, respectively, of the body B. The release rod 72 has a retaining cup 74 that is threadedly mounted with the release rod 72 adjacent threaded rod portion 72a of the release rod 72. An appropriate locking ring 76 prevents movement of the retaining cup 74 along the threaded rod portion 72a once the retaining cup 74 is properly positioned. The cup 74 is provided with a lip 74a and an inner recess or pocket 74b. Each of the pivot arms 52 has an inwardly extending tip 56c which is adapted to extend into pocket or recess 74b so that the lip 74a prevents lateral movement of the arms 56 until the release rod 72 and the cup 74 have moved longitudinally upwardly with respect to the pivot arms 56. Such upward movement of the release rod 72 and the cup 74 is accomplished with the spring 78 which will be hereinafter described.

The calipering tool C has a plurality of feeler means F which extend through suitable openings 24b formed in body member 24 of the body B (FIGS. 3B, 9). The sides of the openings or slots 24b in the body member 24 serve to prevent turning of the feeler means F in response to lateral forces acting on the calipering tool C. The feeler means F includes feelers such as feeler 80 which is normally made of steel and such feelers 80 are circumferentially arranged as best seen in FIG. 1 so that each of such feelers 80 would normally engage the interior surface of the pipe 18 at each elevation traversed by the calipering tool C. Each of the slots 24b in the body B terminates in an inner surface 24c and each feeler 80 has an inner surface 80a which is in contact with inner surface 24c. Each feeler 80 also has an outer notch 80b which is positioned on pivot ring 48 which is preferably formed of a circular cross-section. Thus, each of the feelers 80 is confined against lateral movement except for a pivoting action about the pivot ring 48. In order to retain the feelers 80 in a retracted position during lowering of the calipering tool C to a position in the pipe P for beginning a calipering operation, each of the feelers 80 is provided with an internal surface 80c which is normally tapered outwardly and upwardly (FIG. 3B) for engagement with a retaining collar 82 which preferably has a correspondingly tapered surface 82a for engagement with the surfaces 80c of the feelers 80. The retaining collar 82 is slidably mounted on the release rod 72 and is retained in place by locking rings 86, 88 and spring 78. Upon release of the centering mechanism E, the spring 78 moves the retaining collar 82 longitudinally upwardly to a position above the upper ends of the feeler means F (FIG. 9) so that the feeler means F may then move laterally or radially outwardly into engagement with the interior surface 18a of pipe 18. Locking rings 86, 88 position and locate the retaining collar 82 with the release rod 72 as is necessary.

The calipering tool C of the present invention further includes transmitting means T which is adapted to engage feeler means F and transmit movement thereof to a portion of the stylus members M. The transmitting means T includes transmitting members or arms 90 which are provided in the body B for each of the feeler means F. Each feeler 80 has an inner pocket or curved surface 80d which is engaged by a rounded or curved head 90a at the upper end of each of the transmitting arms 90. The transmitting arms 90 are preferably formed of a resilient metal such as spring steel and are so mounted such that they exert an outward resilient force on the feeler means F to urge them into contact with the inside surface of the tubing or pipe P being calipered after the feeler means F have been released to the position shown in FIG. 9. The transmitting arms 90 are prevented from turning or twisting and are therefore guided in their lateral or radial movement by the walls of the slots 24b for a portion of their length near the upper end thereof and the remainder of each transmitting arm 90 is guided by the walls of longitudinal slots 92a (FIG. 13) of a cylindrical stylus tube extension 92 and corresponding slots 94a of a cylindrical stylus tube 94.

The stylus tube 94 and a stylus tube extension 92 are positioned within an enlarged bore portion 24d of body member 24 and are separated by a rubber ring 96 through which each of the transmitting arms 90 extends, as will be more fully explained. Each of the transmitting arms 90 has an appropriate notch 90b by which the transmitting arm 90 is mounted on a pivot ring 98 which has an appropriate annular pivot lip 98a adapted to be received within the notch 90b of transmitting arms 90. The pivot lip 98a provides a support for preventing each of the transmitting arms 90 from moving longitudinally and serves as a fulcrum when a bending movement is imparted to each of the transmitting arms 90 as will be explained. The upper portion 90c of transmitting arm 90 above the pivot ring 98 is adapted to flex or bend as the feeler means F in conjunction therewith moves inwardly and outwardly in response to engagement with internal surfaces 18a encountered in the pipe P. Such flexing or bending of the upper portion 90c of each transmitting arm 90 causes the lower portion 90d of each transmitting arm 90 to be placed under a strain. This strain deforms the lower portion 90d thereof for imparting longitudinal movement to each of such portions 90d. Each transmitting arm 90 also has an outer surface 90e at its lower end which is in engagement with the head ring 100 for preventing outward lateral movement of each lower portion 90d of the transmitting arms 90. Likewise, inward lateral movement of the lower portions 90d of each of the transmitting arms 90 is prevented by maintaining each of the upper portion 90c under constant compression or stress regardless of the position of the feeler means F, which results in the outer surface 90e being urged into contact with the wall of the head ring 100 of the body B also resulting in each transmitting arm 90 at its notch 90b being maintained in firm engagement with the annular pivot lip 98a of pivot ring 98. Suitable pins 102 (FIGS. 3B, 11) secure the head ring 100 in its proper position with respect to body member 24. The outer surface 90e of the transmitting arm 90 is adapted to engage the head ring surface 100a of head ring 100 for longitudinal movement of the transmitting arm 90 with respect thereto.

The ring 96, previously referred to as formed of rubber or other resilient material, is capable of forming a seal with the inside wall of the bore portion 24d and the pivot ring 98 and also with each of the transmitting arms 90. The ring 96 is confined between the stylus tube 94 and stylus tube extension 92 to likewise provide a seal between such parts. The ring 96 is located as close to the annular pivot lip 98a of pivot ring 98 as possible so that during flexing of the upper portions 90c of transmitting arms 90, substantially no movement occurs in the arms 90 where the seal ring 96 engages therewith. Therefore, the seal provided by the rubber ring 96 is maintained at all times even though the transmitting arms 90 are flexing or are bending during use. It should also be noted that the stylus tube 94 and the stylus tube extension 92 are aligned with a plurality of threaded bolts 104 (FIGS. 3B, 13) which extend through the stylus tube extension 92, through seal ring 96 thereinto stylus tube 94 for securing the stylus tube 94 with a stylus tube extension 92. Such bolts 104 serve to align the stylus tube 94 with the stylus tube extension 92 to properly position the vertical slots therein for receiving the transmitting arms 90.

An adjusting block 106 (FIGS. 3B, 11) is adapted to receive the tip 90f (FIG. 11) of the transmitting arm 90 in an appropriately formed detent 106a in receiving arm 106b of the adjusting block 106. Sliding arm 106c adjoins receiving arm 106b adjacent junction 106d of the adjusting block 106. Preferably, a sliding guided surface 106e (FIG. 11) is formed on sliding arm 106c and adapted to engage a compatibly formed surface 94b formed with cylindrical stylus tube 94 to permit guided longitudinal movement therebetween. Preferably, surface 94b and surface 106e are of a V-configuration and adapted to engage one another to allow the adjusting block 106 to move along the axial length of the calipering tool C of the present invention in response to movement of the tip 90f of the transmitting arm 90. A similarly formed sliding guiding surface 106f is formed adjacent the lower end of the adjusting block 106 and adapted to engage surface 94c of the stylus tube 94 for allowing such longitudinal relative movement of the adjusting block 106 with respect to the cylindrical stylus tube 94. Thus the sliding guiding surfaces 106e, 106f cooperate with similarly formed surfaces 94b, 94c formed in the lower portion 94e of the stylus tube for sliding movement relative thereto while preventing lateral movement therebetween. It will be appreciated that other types of guide structure could be used for the upper and lower ends of the adjusting blocks 106, but the structure illustrated is particularly the preferred form. Suitable openings 106g, 106h are formed in the adjusting block 106 in central portion 106i of the adjusting block 106 and allow a suitable fastening means 108 including fasteners 108a, 108b and fastening plate 108c to be mounted therewith. The stylus members M are adapted to be mounted with the adjusting block 106 by means of the fastening means 108. The fastening means allows the stylus members M to be secured to the adjusting block 106 in a number of secured positions inasmuch as the openings 106g, 106h are larger in diameter than the fasteners 108a, 108b, thus allowing a range of flexibility in mounting of the stylus members with the adjusting block 106.

The stylus members M include a plurality of active styli 110 and a plurality of base-line styli 112 which are discussed more fully hereinbelow. The active styli 110 are adapted to be secured to the adjusting block 106 by the fastening means 108. It will be appreciated that there are a number of active styli 110 that correspond with the actual number of feelers 80 of the feeler means F and accordingly there are a corresponding number of adjusting blocks 106 and fastening means 108 to allow the mounting of the proper number of active styli 110 with such adjusting blocks 106. The stylus tube 94 is comprised of an upper portion 94d and a lower portion 94e with the surfaces 94b, 94c being formed with the lower portion 94e of the stylus tube 94. Openings 94f, 94g are also formed in the lower portion 94e of stylus tube 94 and adapted to receive suitable fastening means 114 therein which includes fasteners 114a, 114b and fastening plate 114c. As with fastening means 108, the fasteners 114a, 114b are adapted to be disposed within openings 94f, 94g, respectively, for relative longitudinal, axial movement of the fasteners 114a, 114b within such openings 94f, 94g, respectively, as is needed. The fasteners 114a, 114b secure the base-line styli 112 of the stylus members M with the lower portion 94e of the stylus tube 94.

As noted hereinabove, the stylus members M include a plurality of active styli 110 and a plurality of base-line styli 112. The number of active styli 110 and base-line styli 112 are such that there is one active styli 110 and one base-line styli 112 for each feeler 80 of the feeler means F for the reasons set forth more particularly hereinbelow. As best seen in FIGS. 3B and 11, the active styli 110 includes a fastening portion 110a, a spring portion 110b, a stylus portion 110c having stylus points 110d mounted therewith, and an engaging lip portion 110e. The fastening portion 110a of the active stylus 110 is adapted to be disposed between the fastening plate 108c of the fastening means 108 and the central portion 106i of the adjusting block 106 with the spring portion 110b extending radially inwardly from the fastening portion 110a. Stylus portion 110c has the stylus point 110d mounted therewith at the radially innermost portion of the styli 110 with an engaging lip portion 110e formed adjacent thereto.

In similar fashion, the base-line styli 112 include fastening portion 112a, spring portion 112b, stylus portion 112c having stylus points 112d mounted therewith, and an engaging lip portion 112e. The base-line styli 112 are mounted with the lower portion 94e of the stylus tube 94 adjacent fastening portion 112a by the fastening plate 114c, engaging the fastening portion 112a and securing the same with the stylus tube 94 by fasteners 114a, 114b. Spring portion 112b extends radially inward from the fastening portion 112a with the stylus portion 112c being formed adjacent thereto with the stylus point 112d extending radially inwardly, and having engaging lip portion 112d formed adjacent thereto. The downwardly and outwardly extending engaging lip portions 110e, 112e of the active and base-line styli 110e, 112, respectively, serve in the retraction of the stylus points 110d, 112d as will be explained. The stylus points 110d, 112d are adapted to engage or contact the external surface of a cylindrical chart 116 when operating the calipering tool C of the present invention, which will be explained in more detail hereinafter. Relative movement between the chart 116 and the stylus members M of the present invention results in lines or other indications being recorded on the surface of the chart 116 to indicate variations in the interior surface 18a of the pipe 18 which are sensed by the feeler means F of the calipering tool C of the present invention.

The adjustment of the styli 110, 112 with respect to the cylindrical chart 116 is made very sensitive by the adjusting structure shown in particular in FIGS. 3B and 11 of the drawings so that accurate positioning of each of the styli 110, 112 with respect to each other and with respect to the chart may be accomplished. Since relatively small changes are recorded with the calipering tool C of the present invention, it is important for the adjustment of the position of these styli 110, 112 be accurate. Loosening of the fastening means 108, 114 allows relative positioning of the styli 110, 112, respectively, with respect to the adjusting block 106 and stylus tube 94 for proper positioning thereof by permitting relative movement of the fastening means 108, 114 within openings 106g, 106h and 94f, 94g, respectively. Such a movement allows shifting of the styli 110, 112 with respect thereto for proper positioning thereof. Each of the active styli 110 and base-line styli 112 is adjusted separately and individually with the structure described hereinabove so that an accurate positioning of each of the stylus points 110d, 112d, respectively, is thereby accomplished. After the adjustment is accomplished, then the active styli 110 move together with the adjusting block 106 in response to movement of the strain or lower portion 90d of the transmitting arm 90 connected therewith.

Preferably, there are fifteen pairs of stylus members M, with each active stylus 110 having a corresponding base-line stylus 112 adjacent thereto. For example and not by way of limitation, with fifteen pairs of stylii 110, 112, the spacing between active stylus, base-line stylus, active stylus, and so forth, is substantially 12° in cross-section as shown in FIGS. 12–14.

A sleeve 118 (FIG. 11) is used to retract the active and base-line styli 110, 112 so as to move the stylus points 110d, 112d out of contact with the chart 116. The sleeve 118 has a plurality of retractor fingers 118a adjoining a tubular portion 118b by means of engaging portion 118c which is affixed to the finger case 120 by means of outwardly extending tabs 118d being secured in any suitable fashion in openings 120a formed in finger case 120. The finger case 120 is mounted with the lower portion 94e of the stylus tube 94 by suitable fasteners 122 extending through the finger case 120 and threadedly affixed with the stylus tube 94. An appropriate number of retractor fingers 118 are formed with the tubular portion 118b of the sleeve 118 such that there are a total number of retractor fingers 118a equal to the total number of stylus members M. As such, the retractor fingers 118a are adapted to engage the engaging lip portions 110e, 112e of active and base-line styli 110, 112, respectively. Each retractor finger 118a engages the engaging lip portions 110e, 112e of each stylus 110, 112 to effect a retraction of the stylus 110, 112 when the retractor fingers 118a are moved radially or laterally outwardly. The stylus members M preferably are made of a resilient material such as spring steel or beryllium copper so that the inherent resiliency thereof will return them to the position shown in FIG. 3B when it is desired to position the styli 110, 112 in contact with the chart 116.

The radial or laterally outwardly movement of the retractor fingers 118a of sleeve 118 is accomplished by moving a retractor sleeve 124 longitudinally upwardly (FIG. 11) relative to the sleeve 118 so as to force the retractor fingers 118a outwardly and thereby force the active styli 110 and base-line styli 112 of the stylus members M outwardly. The upward longitudinal movement of the retractor sleeve 124 is accomplished by removing a plug 126 and locking screw 128 (FIG. 3C) from the body member 28 of the body B. Preferably, a screw driver or other similar tool (not shown) can be inserted into the opening 28a formed in the body member 28 from which the plug 126 is removably mounted to pry or otherwise urge the retractor sleeve 124 upwardly a sufficient distance to engage the engaging portion 118c adjacent end portion 124a of the retractor sleeve 124. Upon engagement therewith, the retractor fingers 118a are moved laterally outwardly. The plug 126 and locking screw 128 are then replaced to hold the retractor sleeve 124 in place. When it is desired to release the retractor fingers 118a and to thereby return the stylus members M into contact with the chart 116, the plug 126 and locking screw 128 are again removed and the retractor sleeve 124 is moved downwardly with respect to the body B by again inserting a screw driver or other similar tool into opening 28a to pry or otherwise move the retractor sleeve 124 by engagement thereof with the notches 124b formed with the retractor sleeve 124. The plug 126 and locking screw 128 are replaced to lock the retractor sleeve 124 in place. The stylus members M would normally be retracted when either the stylus assembly S of the calipering tool C of the present invention is transported as discussed more fully hereinbelow and/or while the calipering tool C was being transported and was not in a well. In such a case, the locking screw 128 would be in the opening 28b formed with the body member 28. Prior to lowering the calipering tool C of the present invention into the well, the retractor sleeve 124 would be lowered to the position shown in FIGS. 3B, 3C wherein the locking screw 128 is such that the retractor sleeve 124 is secured in a position such that the stylus members M are in position for marking on the chart 116. The retractor sleeve 124 is mounted for movement within the finger case 120.

Considering now the construction of the chart 116 and the mounting means therewith for effecting a helical or spiral rotation of the chart 116 relative to the stylus members M, reference is made to FIG. 3B wherein it can be seen that the chart 116 is connected at its upper end with guide sleeve 130 and at its lower end with an annular nut 132 having external threads 132a formed thereon. The chart 116 is positioned around a central drive tool 134 which is provided with a central bore 134a therethrough, through which a portion of release rod 72 extends as well as rod 136. The rod 136 has a slot 136a formed therewith having a collar 135 secured thereto by pin 137. Spring 139 is mounted between collar 135 and drive tool 134 for urging the rod 136 upwardly while spring 141 is mounted above collar 135 to assist in the assembly of the calipering tool C.

The drive tube 134 has an upper reduced diameter extension 134b which is mounted in suitable bearings 138 which are confined below the sleeve 140 within the body B to provide an anti-friction means for the support of the upper end of the drive tube 134 during rotation thereof relative to the body B. Compression spring 78 acts between retaining collar 82 and spring collar 84 thus keeping sleeve 140 and bearing 138 in place at all times. It should be noted that the bearings 138 and that chart 116 are sealed against the ingress of well fluid by suitable seal means 142 which includes seals 142a, 142b. The drive tube 134 is connected to the annular nut 132 with a key 144 which fits within a keyway 132b in the nut 132 so that rotation of the drive tube 134 is imparted directly to the annular nut 132, but the nut 132 is permitted to move longitudinally relative to the drive tube 134. The nut 132 is in threaded engagement with an internally threaded sleeve 146 which has internal threads 146a in threaded engagement with threads 132a of annular nut 132. The sleeve 146 is secured with the body B by means of locking screws 151 mounted with gear housing 156 discussed more fully hereinbelow. As the nut 132 is rotated by rotation of the drive tube 134, the nut 132 is caused to travel spirally in accordance with the pitch and direction of the threads 132a, 146a. The threaded sleeve 146 may be secured in any manner to the body B, but as shown in FIG. 3C, a key 148 and nut 150 are employed to establish such connection so that the threaded sleeve 146 remains fixed in the body B and does not rotate when the nut 132 is rotated.

The chart 116 is shown in FIG. 3B as it would appear at the beginning of the recording. The chart 116 may be made of various materials, such as metals or plastics which may be scratched, embossed, or otherwise changed so that the record thereon may be subsequently viewed or detected. During the storage and/or transportation of the calipering tool C of this invention, the chart 116 may be telescoped or partially telescoped within the sleeve 146. During use, the chart 116 would be rotated to move in a downward direction relative to the threaded sleeve 146. Since the chart 116 would thus be moved rotating longitudinally downwardly relative to the stylus members M, the stylus points 110d, 112d of the styli 110, 112 would cut or trace on the exterior surface of the chart 116 a plurality of substantially parallel helical lines of the same pitch and direction, assuming the feeler means F are engaging the interior surface 18a of a substantially smooth pipe 18. However, for each feeler 80 which encounters an irregularity such as irregularity 18b (FIG. 9) in the interior surface 18a of the pipe P being calipered, there will be a longitudinal movement of the active stylus 110 connected therewith so that there will appear a deflection in the smooth spiral line being traced, cut or marked by the particular active stylus point 110d. Simultaneously, base-line styli 112 for each respective active styli 110 will be tracing a base-line references to indicate respective reference lines from which dimensional measurements may be made for each if the respective active styli 110. Thus, there is one base-line stylus 112 for each active stylus 110, and one active stylus 110 for each respective feeler 80. Such a base-line reference line 152 and active stylus trace line 154 are shown generally in FIG. 2 and discussed more fully hereinbelow.

When the annular nut 132 is rotated sufficiently to bottom out against sleeve surface 146b (FIG. 3C), further rotation of driving shaft 136 will cause slippage between the tapered recess 204a (FIG. 3B) of sleeve 204 and the extended tapered driving point 210b of sleeve 210 thus preventing damage to all parts, as discussed hereinbelow.

Figure 8:
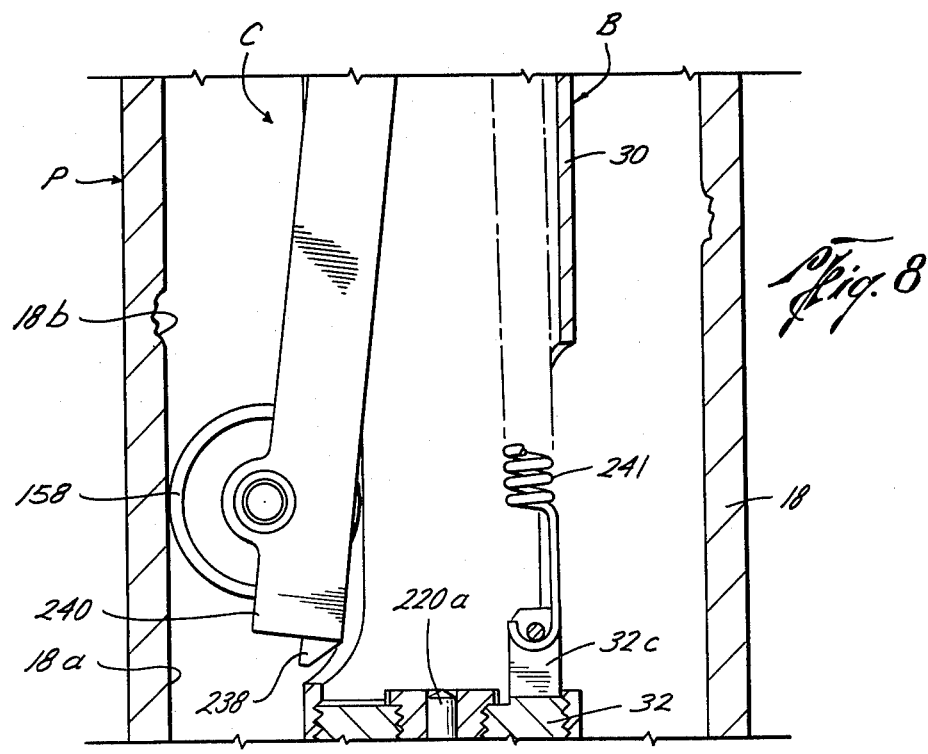
FIG. 8 is a vertical, sectional view, partly in elevation, similar to FIG. 3D, but illustrating the drive wheel of the present invention in a released position.

The drive tube 134 may be rotated with various types of drive mechanisms, but as illustrated in the drawings, and in particular FIGS. 3C, 3D, the drive tube 134 is driven by a drive wheel 158 which, when released, engages the interior surface 18a of the pipe 18 or well tubing or pipe P (FIG. 8). The drive wheel 158 rotates or drives the gears 160, 162 to cause a stub shaft 164 to be driven through a one-way clutch 166, which may be of any suitable construction. The stub shaft 164 is connected to a universal joint 168 by means of pin 170 so that a second stub shaft 172 connected to universal joint 168 by pin 174 is also driven or rotated. The rotation of stub shaft 172 is transmitted to universal joint 176 by means of a suitable slip joint 178 which includes a suitable slot 172a formed in stub shaft 172 and an appropriate pin 178a adapted to move within such slot 172a to allow longitudinal movement of the stub shaft 172 with respect to universal joint 176 yet allow rotation of the universal joint 176 at multiple positions of the stub shaft 172 with respect to the universal joint 176. Rotation of the universal joint 176 is transmitted to stub shaft 180 and is transmitted through gears 182, 184, and other gears not shown to short shaft 186 having gear 188 in contact therewith. Rotation of gear 188 and short shaft 186 results in rotation of gear 190 which engages gear 192 mounted on the lower end of the drive rod 136 by a suitable pin 194 that extends through rod 136 at slot 136a formed at the lower end thereof and gear 192. Pin retainer 196 is adapted to be mounted about the rod 136 and neck 192a of gear 192 for securing the pin 194 in its appropriate location. It should be noted that the lowermost portion of the rod 136 is not depicted in any of the drawings for such extends behind the stub shaft 180.

Rotation of stub shaft 172 may be accomplished more rapidly by manually using any suitable tool that is adapted to engage alignment pin 216 (FIG. 3D) and engage bevel gear 218, to result in rotation of the universal joint 168, stub shaft 172, and other assemblies described hereinabove. The alignment pin 216 provides a positioning member for the tool used to rotate bevel gear 218. Rotation of gear 218 bypasses the one-way clutch 166 and permits rotation of rod 136.

There are three separate and distinct driving configurations which result from movement of the drive rod 136 upward and downward within the confines of slot 136a (FIG. 3C). The first configuration is shown in FIGS. 3A, 3B wherein the calipering tool C is in a cocked or retracted position. The second configuration is shown in FIGS. 9, 10 wherein the calipering tool C is in an operational position released from the cocked or retracted position. The third configuration is a result of the driving clutch being manually manipulated to permit the chart 116 to be moved upwardly or downwardly as may be desired.

Considering first the relative positions of parts in the cocked or retracted configuration, the drive rod 136 and pinned sleeve 210 are in a lowermost position with tab 210a in engagement with receiving slot or detent 202a in sleeve 202. Sleeve 202 is pinned by pins 206 to drive tube 134. Drive tube 134 is pinned by pins 208 to sleeve 204 which contains a suitable J-slot 204b for receiving and holding cross pin 72c of release rod 72. In this position (FIGS. 3A, 3B), release rod 72 threadedly engages retaining cup 74 and locking collars 86, 88 which combine to hold retaining collar 82 under feelers 80, with the contacting surfaces 80c and 82a retaining feelers 80 in a cocked or retracted position. In addition, centralizing shoes 52 are free to be in the retracted position shown in FIG. 3A. Pivot arms 56 are restrained in a retracted position by retaining cup 74. It should be noted that in the cocked or retracted position, the chart 116 and styli 110, 112 are in the positions shown in FIG. 3B.

As discussed more fully hereinbelow, when the caliper tool C of the present invention has been lowered into the pipe P and the latch mechanism L has released, the drive wheel (FIG. 8) engages the pipe P such that upward movement of the caliper tool C causes the drive wheel 158 to rotate. This drive wheel 158 rotation results in the rotation of drive rod 136. Continued rotation of drive rod 136 causes sleeve 204 and J-slot 204b to rotate, thus releasing cross pin 72c from J-slot 204b, thus permitting trip rod 72 to move upwardly from the position shown in FIGS. 3A, 3B in response to the resilient urging of spring 78 to positions shown in FIGS. 9, 10. The retaining collar 82 moves upward with release rod 72 and out of contact with the feeler means F, allowing the feeler means F to move outwardly in response to the urging of resilient transmitting arm 90 and spring means 212 into contact with the internal surface 18a of pipe P. The upward movement of the retaining cup 74 releases pivot arm 56 causing shoes 52 to move outwardly to engage with internal surface 18a of pipe P thus centralizing this end of the caliper tool C of the present invention.

Upward movement of trip rod 72 also removes the restraining action on end 136b of drive rod 136, which is then forced upwardly by action of spring 139 until the driving tab 210b of drive collar 210 engages slot 204a of sleeve 204. Continued rotation of driving rod 136 causes driving sleeve 134 and chart 116 to rotate for recording purposes. As previously explained, the sloping sides of tab 210b and receiving slot 204a permit slippage therebetween should any rotated part be restrained from its rotation before any damage can occur.

A third position of driving sleeve 210 is provided to permit manual movement of chart 116 upwardly or downwardly as desired for protecting the scribing surface 116b of chart 116. As seen in FIGS. 3A, 3B the insertion of an appropriate tool, such as a screw driver or the like, through the bore 36a of wireline receiver 36 to engage slot 72d and thereafter pressing downwardly thereon until cross pin 72a is partially engaged in J-slot 204b, disengages drive sleeve 210 from contact with sleeves 204. The slot 72d permits the depressing tool to rotate the drive sleeve 134 and so cause chart 116 to move downwardly within the protection of internally threaded sleeve 146 or upwardly to its starting position or for removal.

The drive wheel is maintained in a retracted or inactive position (FIG. 3D) so that the wheel 158 does not project beyond the body B by means of a holding pin 220 which is slidably mounted in the body B in any suitable manner for longitudinal movement relative thereto. The holding pin 220 is held in an upward position as shown in FIGS. 3D and 3E by the latch mechanism L of the present invention which is hereinafter described. A spring 222 is mounted around the pin 220 and rests upon collar 224 which is secured to the holding pin 220 by pin 226 while the upper end of the spring 222 engages a plug 228 which is threadedly received in threaded opening 32a formed in body member 32, so that the spring 222 acts to urge the collar 224 and holding pin 220 downwardly. The holding pin 220 also has retaining cups 230, 232 secured thereon by pins 234, 236, respectively, the purpose of which will be hereinafter explained. Thus, the upper end 220a (FIG. 3E) of holding pin 220 engages tab 238 formed with shaft housing 240 while the lower end 220b of the holding pin 220 is in engagement with latch arm 242 adjacent the upper end 242a thereof. The latch arm 242 is mounted for movement with the body B such that it may pivot about a pivot pin 242b or move radially within radial slot 32b formed in body member 32. The latch arm 242 is preferably held in a substantially upright position by shear pin 244 which extends through the latch arm 242 and through the wall of the body member 32 of the body B therewith. As long as the latch arm 244 is in a substantially upright position in engagement with the lower end 220b of the holding pin 220, the spring 222 is under compression and the pin 220 is held against downward movement by the latch arm 242.

A lateral releasing dog 246 which includes an elongated slot 246a is mounted on a pivot pin 248 which is mounted with the body member 32 such that the pivot pin 248 extends through the elongated slot of the lateral releasing dog 246. Such a mounting configuration allows pivoting as well as radial action of the lateral releasing dog 246 with respect to the body B of the calipering tool C of the present invention. A spring 250 connects with the lateral releasing dog 246 at pin 246b and with the body member 32 of the body B by bolt 252. As the calipering tool C is lowered into the pipe P, the spring 250 is in a position more extended than shown in FIG. 3E with the lateral releasing dog 246 having its curved surface 246c and tip 246d in a more vertical orientation. The spring tension from the spring 250 is not sufficient, however, to move the latch arm 242 to the right as viewed in FIG. 3E. As the calipering tool C is lowered into the well, the curved surface 246c rides on the interior surface 18a of the pipe 18 and is allowed to encounter variations in the pipe and collar and moves freely upwardly without affecting the position of the latch arm 242. When it is desired to release the latch arm 242, the calipering tool C of the present invention is raised upwardly so that the tip 246d and horizontal surface 246e of the releasing dog 246 is allowed to engage a collar or other substantially lateral surface 18c in the pipe P to allow a counterclockwise movement of the releasing dog 246 about the pivot pin 248. Such movement imparts a force in the right hand direction to the latch arm 242 (as viewed in FIG. 3E) because the surface 246f acts against latch arm surface 242d and moves in an arc which extends to the right of the substantially vertical position shown in FIG. 3E. In that manner, the shear pin 244 is severed and the latch arm 242 is moved to the right sufficiently so that the spring 222 moves the holding pin 220 downwardly to the position shown in FIG. 7. Movement of the holding pin 220 permits rotation of shaft housing 240 in response to spring 241 affixed to upper portion 240a of housing 240 and portion 32c of body member 32.

In some instances, it may be desirable to release the latch arm 242 by engaging the bottom of the hole or some other surface at the lower end of the calipering tool C rather than the releasing dog 246 engaging a lateral surface such as 18c of the pipe P. In that instance, the latch mechanism L of the present invention includes a bottom release dog 254 which is slidably mounted in the body member 34 with the lower end of the calipering tool C and which is secured thereto with a shear pin (not shown) adapted to extend through opening 254a formed in bottom release dog 254. A spring 256 is confined under compression between the body member 34 and collar 254b of release dog 254. Upon shearing of the shear pin in the opening 254a, the spring 256 is allowed to expand upwardly resulting in upward movement of the bottom release dog 254. The shear pin is severed with the resultant upward movement of the bottom release dog 254 upon the head 260 contacting the bottom of the well or other surface. Upon upward movement of the bottom releasing dog 254, the surface 246g of the lateral releasing dog 246 is contacted by the upper end 254b of the bottom releasing dog 254, with this engagement of the lateral releasing dog 246 resulting in rotation of dog 246 about pin 248. The contact of the lateral releasing dog 246 with latch arm surface 242d, shears shear pin 244, resulting in movement of the latch arm 242 in a counterclockwise movement. As a consequence, the upper end 242a of the latch arm 242 moves from the lower end 220b of the holding pin 220 allowing release thereof (FIG. 7). It will be appreciated that when the bottom release dog 254 is utilized for tripping the calipering tool of the present invention, the releasing dog 246 must be of a length such that when surface 246f engages surface 242d (as it must, prior to tripping), the releasing dog 246 extends outwardly substantially perpendicular to the longitudinal axis of the calipering tool C no farther than the radius of the inside diameter of the pipe P, as shown in dotted lines by end surface 246h.

Latch arm spring means designated generally as 262 includes a wiper-type spring 262a which is mounted with the body B adjacent the connection between body members 32, 34 and end ring 50. The spring 262a urges the upper end 242a of the latch arm 242 into engagement with the side of the lower end portion 220b of the holding pin 220 to insure that the latch arm 242, after release, does not interfere with any further operations of the calipering tool of the present invention. As such, the latch arm spring means 262 is mounted with the body B for biasing the latch arm 242 towards the central portion of the body B after the latch arm 242 has been released.

In order to maintain the lower end of a calipering tool C of this invention centered after the drive wheel 158 has moved out through the opening 30a formed in the body member 30 into engagement with the pipe P, a centering shoe 264 (FIGS. 3E, 7) is provided which is mounted with the body B for lateral movement relative to the body B. A spring 266 is positioned behind or inside the shoe 264 for urging the shoe 264 outwardly. The shoe 264 is connected to a pair of blocks 268, 270 which are retained in a retracted position by latching in engagement with retaining cups 230, 232, respectively. After holding pin 220 is released by movement of the latch arm 242 to the right as previously explained, the retaining cups 230, 232 move downwardly with the holding pin 220 relative to the blocks 268, 270 so that the spring 266 can then force the shoe 264 into engagement with the inside surface 18a of the pipe 18. Guide members 272, 274 act to guide the centering shoe 264 as it moves radially outwardly with each of such members 272, 274 having a suitable recess 272a, 274a for receiving tabs 264a, 264b, respectively, of the centering shoe 264. The guide members 272, 274 also limit the extent to which the centering shoe 264 may extend radially outwardly.

As noted hereinabove, the feeler means F may be urged outwardly by the resilient nature of the transmitting arms 90 or by spring means 212. The spring means 212 includes a plurality of spring arms 212a (FIGS. 3B, 12) which have curved tips 212b for engaging the feelers 80 at the upper end thereof and openings 212c, 212d formed adjacent the lower end thereof for receiving upper and lower fasteners 276, 278 for securing each of the arms 212a with spring mounting block 280. Spring sleeve 282 is mounted about the fasteners 276, 278 and lower portion of the arms 212a of the spring means 212 and is positioned secured with the body B by appropriate bolts such as 284. Set screws such as 286 permit proper positioning of the spring mounting block 280 with respect to the body member 26 to ensure proper orientation of the arms 212a with the feelers 80 of the feeler means F. When the feeler means F are in the released position, the spring means 212 ensures that the feeler means F is in positive engagement with the interior surface 18a of the pipe that is to be calipered. The spring means 212 further enables the calipering tool C of the present invention to be used in pipes P of varying diameters by merely changing the end rings 44, 50 adjacent the end of the calipering tool C, spring means 212 and feeler means F ensuring that the feelers are in positive contact with the interior surface 18a of the pipe 18 to be calipered. As best seen in FIG. 12, the spring means 212 are in radial alignment with the active styli 110 while no such structure is correspondingly adjacent the base-line styli 112.

As noted hereinabove, the calipering tool C is adapted to be used with various size pipes P to be calipered. However, in addition to sizing of end rings 44, 50 in accordance with the inside diameter of the pipe P to be calipered, it is also necessary to accommodate such differences with adjustment means A with the body B for adjusting the registration of the base lines of the base-line styli 112 on the chart 116 with the trace lines of the active styli 110 on the chart 116 to accommodate variations in inside diameter of the pipe to be calipered. As best seen in FIGS. 11 and 14, the adjustment means A includes plural inserts 288 which are removably mounted with the body B, preferably between the upper portion 94d and lower portion 94e of stylus tube 94. As illustrated in FIG. 14, preferably three of such inserts are circumferentially arranged about the cross section of the calipering tool C with such inserts 288 preferably being of a substantially flat, T-shaped configuration. Preferably, the thickness of the T-shaped inserts may be varied in minute increments to ensure a range of proper registrations of the trace lines 154 of the active styli 110 with the base lines 152 of the base-line styli 112. Thus, the inserts 288 allow for selective spacing between the upper and lower portions 94d, 94e of the stylus tube 94 of the body B. The adjustment means A further includes adjustment bolts 290 adapted to extend through openings 92b, 92c formed in stylus extension tube 92, through ring 96 into opening 94h formed in upper portion 94d of stylus tube 94, thereinto threaded opening 94i formed in lower portion 94e of stylus tube 94. Preferably, a suitable spring 292 is disposed between the upper and lower portions 94d, 94e of the stylus tube 94. The spring 292 resiliently urges the upper and lower portions 94d, 94e apart as far as permitted by bolts 290 when the clamping force is removed by threading and separating the body members 24, 26 so as to permit ease of removal of inserts 288 and reinsertion thereof of properly sized inserts 288. It should be understood that the thickness of the insert 288 varies for pipes P of different weights and inside diameters. As noted hereinbelow, it is desirable that the base lines 152 of the base-line styli 112 and the trace lines 154 of the active styli 110 be in proper registration with one another and accordingly the ease with which the inserts 288 may be removed and appropriately sized is of significance. Preferably, the trace and base lines 154, 152 of both the active and base-line styli 110, 112, respectively, are maintained atop one another in zero adjustment, thus in proper registration as shown at point 320 of FIG. 2. Mere unthreading and separation of the body members 24, 26 and the separation permitted by bolts 290 permits the removal of the inserts 288 and reinsertion of other such inserts 288 of different size without disassembly of the stylus assembly S of the present invention.

The stylus assembly S of the present invention is adapted to be removably mounted with the body B and includes the structure shown in FIG. 11 including the transmitting arms 90, stylus tube extension 92, cylindrical stylus tube 94, rubber ring 96, the adjusting blocks 106, fastening means 108, 114, active styli 110, base-line styli 112, sleeve 118, finger case 120, and retractor sleeve 124. The entire stylus assembly S is adapted to be removed from the calipering tool C of the present invention and shipped apart from the calipering tool C. Moreover, this stylus assembly S can be adjusted for the proper alignment and positioning of all stylus points 110c and 112d as a unit and will retain its proper adjustment regardless of which caliper body it is made apart thereof. This is significantly different from calipering tools of the past in that if adjustment or repair were necessary, the entire calipering tool C had to be removed and shipped in order for repair or adjustment thereof to be made. However, the calipering tool C of the present invention is adapted to be pulled from the pipe P, partially disassembled and have the stylus assembly S removed intact and replaced with a spare stylus assembly S, and put back into service immediately without loss of time whereinafter the damaged stylus assembly S can be appropriately repaired and readjusted without requiring replacement of the other components of the calipering tool C of the present invention.

In the operation or use of the calipering tool C of the present invention, the calipering tool C is lowered into the pipe P or other device to be calipered, with the wheel 158 in the retracted position shown in FIG. 3D and with the feeler means F in the retracted position shown in FIG. 3B. Likewise, the centering means E is in the retracted position of FIG. 3A. As the calipering tool C is lowered into the pipe P or other object to be calipered, the feeler means F do not engage the internal surface 18a of the pipe 18 to be calipered and no record is made on the chart 116. When the calipering tool C has reached the lowest level at which the calipering is to begin, the latch arm 242 is released by the lateral releasing dog 246 either engaging a lateral surface 18c of the pipe 18 or being moved by the bottom release dog 254 upon engagement of the head 260 with the bottom of the hole. The movement of the latch arm 242 allows the pin 220 to move downwardly from the position shown in FIG. 3E to that shown in FIG. 7. In that manner, the drive wheel 158 is permitted to move outwardly to the position shown in FIG. 8 because of the action of spring 241 acting on shaft housing 240. Also, the downward movement of the pin 220 releases the blocks 268, 270 and the spring 266 therewith so that the shoe 264 moves into engagement with the pipe P. Upward movement of the calipering tool then causes drive wheel 158 to rotate in engagement with the interior surface 18a of the pipe P to impart a rotation to the stub shaft 164 as previously explained. Such rotation of the shaft 164 allows the drive rod 136 to rotate in such a fashion that the pin 72c is released from J-slot 204b so that the release rod 72 is moved upwardly by action of the spring 78. Such upward movement of the release rod 72 effects the release of the feeler means F into engagement with the inside of the pipe P since the retaining collar 82 is moved upwardly above the upper ends of the feelers 80 as shown in FIG. 9. Also, the upward movement of the release rod 72 permits movement of the pivot arms 56 outwardly by the action of the spring 70 so that the centering shoes 52 are moved outwardly into engagement with the pipe P.

Normally at the beginning of the calipering operation the chart 116 would be positioned extended from the internally threaded sleeve 146 as shown in the drawings, and as the drive wheel 158 is moved into engagement with the pipe P by upward movement of the calipering tool C in the pipe P, the drive tube 134 imparts rotation to the chart 116 so that it travels helically or spirally downwardly within the body B of the calipering tool C. The active styli 110 and base-line styli 112 are in engagement with the chart 116 to mark the surface of the chart 116 with a single trace line 154 for each active stylus 110 and a separate additional base-line 152 marked by the base-line stylus 112 corresponding to each respective active stylus 110. Since there are separate active styli 110 and base-line styli 112 for each of the feeler means F, a separate record is thus made for each of the feelers 80. Therefore, if any irregularities such as 18b (FIGS. 8, 9) are encountered by any of the feelers 80 of the calipering tool C as it is moved or pulled longitudinally upward in the pipe, the normally smooth helical or spiral line 154a traced by the active stylus 110 will be varied in accordance with the size of the variation to indicate a surface variation such as 154b (FIG. 2) at the point encountered by the feeler means F. In that manner an accurate indication as to the condition of the surface of the inside of the pipe P is obtained on the chart 116. Simultaneously, a base-line such as 152 is being marked or traced on the chart 116 by the base-line styli 112 with the base-line trace 152 providing an instant reference point from which to measure variations.

In most instances, there are thermal gradients in the well that are experienced by the calipering tool C during its use during calipering operations. These temperature differences experienced by the calipering tool C cause varying thermal expansions within the tool based upon the various different metals and alloys of the calipering tool C that are simultaneously experiencing differing heating and/or cooling effects as the calipering tool C is moving upwardly while surveying the well. By maintaining separate base-line references for each of the active styli 110 errors inherent in thermal changes during the survey will generally be eliminated and active and base-line traces will still be superimposed as at 320 (FIG. 2).

However, under certain physical combinations, such as the well-known fact that most oil well tubing and casing actually has a larger inside diameter than the "nominal inside diameter" specified by the manufacturers and in published handbooks, the active trace line 154c will be displaced away from the base-line traces 152a a differential designated generally as 340. Under such conditions, the actual amount of movement 340a which may have been caused by an irregularity 18b encountered by the calipering tool C in pipe P, when measured from the base-line trace 152a, will be decreased by the amount of the differential 320 to give the time depth of the irregularity 18b as measured from the original internal surface 18a of the pipe P.

When the calipering operation is completed, the calipering tool C is removed from the well or pipe P and the chart 116 is removed from the body of the calipering tool C by disassembly thereof. Prior to the removal of the chart 116 from the body B, the sleeve 124 can be moved into contact with the engaging portion 118c of the sleeve 118 to retract the active and base-line styli 110, 112 from the chart 116. It will be understood that for each run of the calipering tool C in a pipe P, it will normally require a new chart 116 and for that purpose, the charts 116 are replaceable.

Thus, the calipering tool C of the present invention provides a new, useful calipering tool C that is capable of being used in pipes P of various diameters and by the use of base-lines to more accurately record variations in the interior surface of a pipe to be calipered, even though internal variations may occur because of thermal gradients in the well, which heretofore have not been compensated for. Furthermore, the calipering tool of the present invention provides a replaceable stylus assembly S which may be removed from the calipering tool C and and repaired without requiring removal and repair of the entire calipering tool C. In addition, the calipering tool C contains a novel driving arrangement to more easily control cocking, releasing, operating and chart movement functions. It should be understood that the calipering tool C of this invention may be used for calipering operations on surfaces other than a pipe P and therefore, even though the invention is described for use in a pipe P, the use of the invention is not limited thereto.

The foregoing disclosure and description of the invention is illustrative and explanatory thereof and various changes in the size, shape and materials, as well as in the details of the illustrated construction, may be made within the scope of the appended claims without departing from the spirit of the invention.

We claim:

1. In a calipering tool for use in a pipe and having a body and feeler means mounted with the body for engaging the surface of the pipe being calipered, the feeler means for moving in response to the variations in the surface of the pipe, the improvement residing in a chart, a plurality of active styli and at least one base-line stylus, each of said active styli adapted to engage said chart and move relative thereto in response to movements of said feeler means and said base-line stylus adapted to engage said chart in measured spaced relationship with respect to said active styli for providing a continuous base line during calipering operations for accurately determining the amount of movement of the feeler means.

2. The structure set forth in claim 1, wherein said active styli and said base-line stylus are arranged relative to one another to maintain accurate thermal calibration of the calipering tool in response to temperature variations encountered within the pipe.

3. The structure of claim 1, further including transmitting means pivotally mounted with the body for engaging the feeler means and transmitting movement thereof to said active styli, said transmitting means pivoting about an annular ring with the body.

4. The structure of claim 1, further including feeler spring means with the body for urging the feeler means radially outwardly for insuring positive engagement thereof with the surface of the pipe.

5. The structure of claim 1, further including adjustment means with the body for adjusting the registration of said base-line of said base-line stylus on said chart with the trace lines of said active styli on said chart to accommodate variations in inside diameter of the pipe to be calipered.

6. The structure of claim 5, wherein said adjustment means includes plural inserts removably mounted with the body without requiring complete disassembly of the body for removal thereof, said inserts selectively sized to provide proper registration of the trace lines of said active styli with said base line of said base-line stylus on said chart.

7. In a calipering tool for use in a pipe and having a body and feeler means mounted with the body for engaging the internal surface of the pipe being calipered for moving in response to the variations in the internal surface, the improvement residing in a unitary stylus assembly removably mounted with the body, said stylus assembly including a stylus tube having active styli and at least one base-line stylus mounted therewith, said stylus tube, said active styli, and said base-line stylus being removably mounted with the body as an assembled unit.

8. The structure of claim 7, wherein said stylus assembly further includes transmitting means with said stylus tube and adapted to engage the feeler means and transmit movement thereof to said active styli.

9. The structure of claim 8, wherein said stylus assembly further includes adjustment means with said stylus tube and adapted to adjust the registration of said base-line stylus with said active styli for accommodating variations in inside diameter of the pipe to be calipered.

10. The structure of claim 9, wherein said stylus assembly permits adjustment, alignment, and positioning of said active styli and said base-line stylus with said stylus tube as a unit, independent of the body of the calipering tool.

11. The structure of claim 10, wherein said adjusted stylus assembly is adapted to be interchangeably used in any body of the calipering tool and remain in calibration.

12. The structure of claim 11, further including a retractor sleeve mounted with said stylus tube for engaging said active styli and said base-line stylus to permit mounting of said stylus assembly with the body without damaging said active styli and said base-line stylus and preventing such from coming into contact with the chart previously assembled in the body during mounting of said stylus assembly with the body.

13. The structure of claim 9, wherein said stylus tube includes an upper portion and a lower portion, said lower portion having said active styli and said base-line stylus mounted therewith, said upper portion having said transmitting means therewith, said upper and lower portions of said stylus tube adjoining adjacent said adjustment means.

14. The structure of claim 13, wherein said adjustment means includes plural insert means removably disposed between said upper and lower portions of said stylus tube for selectively spacing said upper and lower portions from one another.

15. The structure of claim 14, wherein said adjustment means includes a plurality of adjustment bolts mounted with said upper portion for threadedly engaging said lower portion of said stylus tube and a plurality of adjustment springs for mounting about said adjustment bolts and between said upper and lower portions to enhance ease of placement of said insert means.

16. In a calipering tool for use in a pipe and having a body and feeler means mounted with the body for engaging the surface of the pipe being calipered, the feeler means for moving in response to the variations in the surface of the pipe, the improvement residing in a latch mechanism for releasing the feeler means from a retracted position wherein the feeler means do not engage the surface of the pipe to a released position wherein the feeler means engage the surface of the pipe, said latch mechanism having a lateral release dog pivotally mounted with the body and adapted to engage a lateral surface of the pipe, a latch arm for releasing the feeler means from said retracted position to said released position, a bottom release dog movably mounted with the body, said bottom release dog movable from an extended position wherein the feeler means is in said retracted position to a compressed position for releasing the feeler means to the released position, said movement of said bottom release dog from said extended position to said compressed position resulting in said bottom release dog engaging said lateral release dog for engaging said latch arm for permitting movement of the feeler means from said retracted position to said released position.

17. The structure of claim 16, further including latch arm spring means mounted with the body for biasing said latch arm towards the central portion of the body after said latch arm has released the feeler means.

18. The structure of claim 16, wherein said latch arm is mounted with the body for selected pivotal and radial movement.

19. The structure of claim 18, further including a pin mounted with said latch arm, the body formed having a radial slot therein for receiving said pin to permit said selected pivotal and radial movement of said latch arm.

20. In a calipering tool for use in a pipe and having a body and feeler means mounted with the body for engaging the surface of the pipe being calipered, the feeler means for moving in response to the variations in the surface of the pipe, the feeler means movable between a retracted position not in engagement with the pipe surface and a released position in engagement with the pipe surface, the improvement residing in a drive means for driving a chart capable of recording movement of the feeler means, said drive means including a drive tube, a drive rod mounted for movement in said drive tube, and clutch means with said drive tube and said drive rod permitting movement of the feeler means between the retracted and released positions, said clutch means including a first sleeve, a second sleeve, and a third sleeve, said first sleeve mounted about said drive rod and with said drive tube, said second sleeve mounted with said drive rod within said drive tube for movement therein, said second sleeve adapted to engage said first sleeve for rotation thereof, and said third sleeve mounted with said drive tube and for receiving therein a portion of said drive rod and a portion of a release rod, said release rod for releasing the feelers from the retracted position to the released position, said third sleeve adapted to be operatively engaged by said second sleeve for movement of said release rod for releasing the feeler means.

21. The structure of claim 20, wherein said release rod has a release pin mounted therewith, and said third sleeve is formed having a J-slot therewith, said release pin adapted to be movably disposed within said J-slot.

22. The structure of claim 20, wherein said second sleeve is adapted to rotate said third sleeve after releasing the feeler means.

23. The structure of claim 22, wherein said second sleeve can be moved out of driving engagement with said third sleeve and said chart is movable manually.

24. The structure of claim 22, wherein:
said third sleeve is formed having a slot with sloping sides; and
said second sleeve is formed having a v-shaped tab adapted to engage said slot permitting disengagement between said slot and said tab while driving the calipering tool.

25. The structure of claim 23, wherein a tool is adapted to engage and depress said second sleeve to move said second sleeve out of engagement with said third sleeve and to rotate said chart as desired.

26. The structure of claim 25, wherein the chart may be rotated and positioned without disassembly of the calipering tool.

27. The structure of claim 25, wherein the chart may be rotated and positioned after partial disassembly of the calipering tool during chart installation or removal.

* * * * *